(12) United States Patent
Dziuk et al.

(10) Patent No.: US 12,126,765 B1
(45) Date of Patent: Oct. 22, 2024

(54) DESIGNATED AGENT FOR CALLER AUTHENTICATION AND AUTHORIZATION

(71) Applicant: UIPCO, LLC, San Antonio, TX (US)

(72) Inventors: Janelle Denice Dziuk, Falls City, TX (US); Jon D. Mceachron, Boerne, TX (US); Steven Michael Bernstein, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 224 days.

(21) Appl. No.: 17/932,367

(22) Filed: Sep. 15, 2022

(51) Int. Cl.
*H04M 3/42* (2006.01)
*H04M 1/56* (2006.01)
*H04M 3/56* (2006.01)
*H04M 15/06* (2006.01)

(52) U.S. Cl.
CPC ......... *H04M 3/42068* (2013.01); *H04M 1/56* (2013.01); *H04M 3/56* (2013.01); *H04M 15/06* (2013.01)

(58) Field of Classification Search
None
See application file for complete search history.

(56) References Cited

U.S. PATENT DOCUMENTS

| | | | |
|---|---|---|---|
| 6,711,400 | B1 | 3/2004 | Aura |
| 8,554,674 | B1 | 10/2013 | Subealdea et al. |
| 8,817,961 | B1 * | 8/2014 | Sterman ............ H04M 3/42042 379/207.14 |
| 9,706,401 | B2 * | 7/2017 | Vincent .................... G06F 21/34 |
| 10,149,156 | B1 | 12/2018 | Tiku et al. |
| 10,154,025 | B2 | 12/2018 | Tinnakornsrisuphap et al. |
| 10,218,695 | B1 | 2/2019 | Jain |
| 10,445,732 | B2 | 10/2019 | Oberheide et al. |
| 10,659,459 | B1 | 5/2020 | Gadwale |
| 10,958,774 | B1 * | 3/2021 | Harding .............. H04W 12/043 |

(Continued)

OTHER PUBLICATIONS

Alexandre Alapetite, "Dynamic 2D-barcodes for multi-device Web session migration including mobile phones", Technical University of Denmark, Department of Management Engineering Produktionstorvet 426-A, DK-2800 Kongens Lyngby, Denmark, doi: 10.1007/ s00779-009-0228-5. (Year: 2010).

*Primary Examiner* — Quoc D Tran
(74) *Attorney, Agent, or Firm* — Potomac Law Group, PLLC; Dannon G. Allbee

(57) ABSTRACT

Methods and systems described herein are directed to verifying a caller's identity and/or authorizing a caller's access to an account using a third party designated agent. A caller verification system can register an agent in association with an account holder's user account with an organization. When a caller attempts to access the account holder's user account during a phone call with a representative from the organization, the caller verification system can automatically request that the agent verify the caller's identity. In some implementations, the caller verification system can bridge or conference in the agent to the phone call to allow the agent to verify the caller's identity and indicate to the representative that the caller's identity matches that of the account holder. The caller verification system can also receive verification messages from the agent via text message, email, HTTP request, or other digital means.

20 Claims, 11 Drawing Sheets

(56) References Cited

U.S. PATENT DOCUMENTS

| | | |
|---|---|---|
| 2003/0110381 A1 | 6/2003 | Aoshima et al. |
| 2006/0053296 A1 | 3/2006 | Busboom et al. |
| 2008/0181379 A1* | 7/2008 | Chow ................. H04L 63/1441 379/142.05 |
| 2011/0149867 A1 | 6/2011 | Rudolf et al. |
| 2011/0219427 A1 | 9/2011 | Hito et al. |
| 2011/0270751 A1 | 11/2011 | Csinger et al. |
| 2012/0198531 A1 | 8/2012 | Ort et al. |
| 2013/0262857 A1 | 10/2013 | Neuman et al. |
| 2014/0223516 A1 | 8/2014 | Vongsouvanh et al. |
| 2014/0230039 A1 | 8/2014 | Prakash et al. |
| 2015/0334108 A1 | 11/2015 | Khalil et al. |
| 2017/0068958 A1* | 3/2017 | Oberheide ............ G06Q 20/108 |
| 2017/0250974 A1 | 8/2017 | Antonyraj et al. |
| 2018/0034798 A1 | 2/2018 | Vincent et al. |
| 2018/0041339 A1 | 2/2018 | Lee |
| 2018/0332042 A1 | 11/2018 | Yu et al. |
| 2019/0074972 A1 | 3/2019 | Shastri et al. |
| 2019/0297075 A1 | 9/2019 | Kaladgi et al. |
| 2019/0312726 A1 | 10/2019 | Sierra et al. |
| 2019/0327226 A1* | 10/2019 | Brown .................... G06F 21/31 |
| 2019/0386984 A1 | 12/2019 | Thakkar et al. |
| 2020/0029268 A1 | 1/2020 | Russell et al. |
| 2020/0236113 A1 | 7/2020 | Monica et al. |
| 2021/0092227 A1* | 3/2021 | Naujok ............. H04M 3/42034 |
| 2021/0152689 A1 | 5/2021 | Gayaldo |

\* cited by examiner

DESIGNATED AGENT FOR CALLER
AUTHENTICATION AND AUTHORIZATION

TECHNICAL FIELD

The present disclosure is directed to methods and systems for performing multi-user caller authentication and authorization.

BACKGROUND

Individuals and organizations today face increasingly complex and expansive cybersecurity threats. As user data has become more distributed across different organizations, the risk of identity theft has increased dramatically. While advances in cryptography have helped to secure digital Internet communications, communication by telephone remains comparatively less secure. Historically, an individual or company is assigned a unique phone number which could be used to manually verify the identity of a caller. When "Caller ID" was introduced, the calling party's registered name would appear on the called party's phone, making it possible to identify the caller without knowledge of the specific phone number. Despite these measures, it is possible for hackers to spoof telephone numbers and caller ID, which can falsely lead called parties to believe the purported identity of the caller.

In an effort to improve caller verification, companies and government agencies have implemented security practices that involve asking a series of identification verification questions to the caller. Such security practices are vulnerable to hackers who have obtained a user's sensitive information by compromising a data custodian's computer systems and/or by engaging in social engineering. If a hacker has obtained enough sensitive information about a user, they may be able to answer identification verification questions correctly to gain access to a user's accounts with their bank, insurance company, and/or other institutions-thereby exposing them to further identity theft and financial crimes.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
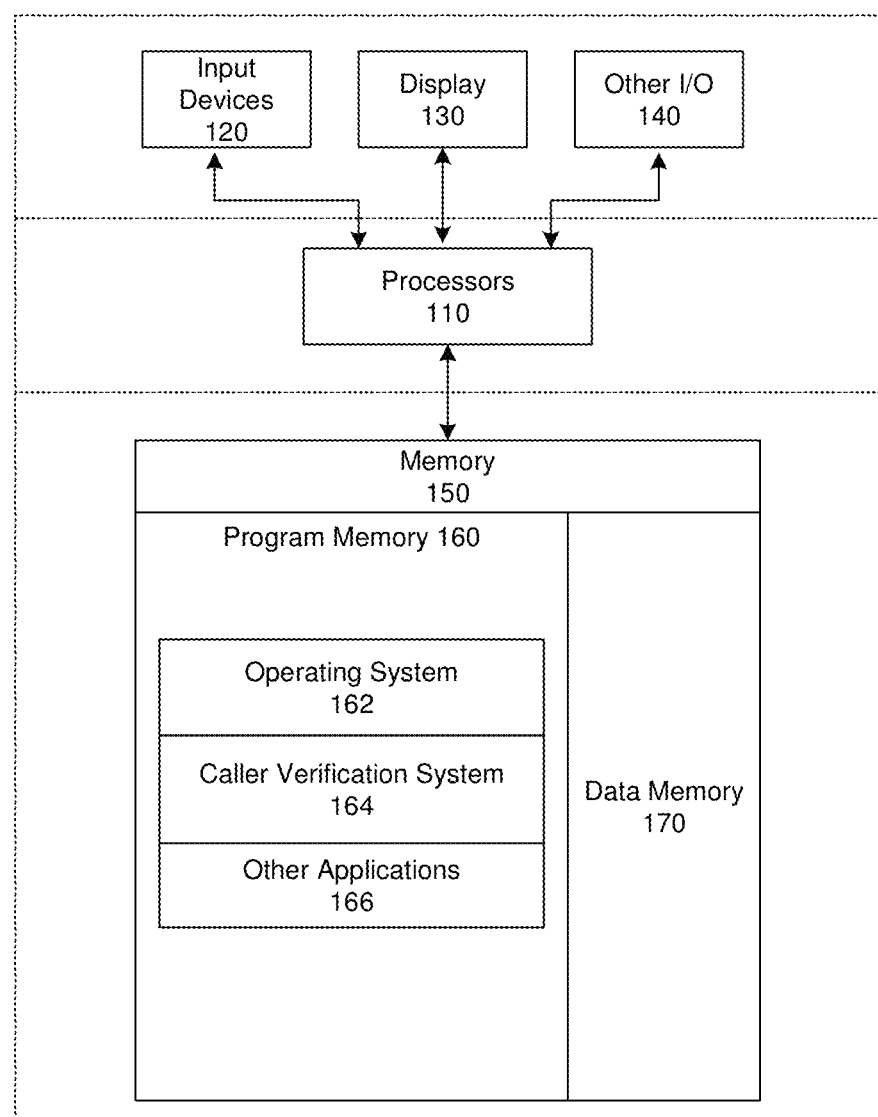
FIG. 1 is a block diagram illustrating an overview of devices on which some implementations can operate.

Aspects of the present disclosure are directed systems and methods for verifying a caller's identity and/or authorizing a caller's access to an account using a third party designated agent. In an example embodiment, an account holder registers a third party agent-such as an immediate family member, relative, or other trusted individual—with a caller verification system of a business, institution, or other organization (e.g., including the agent's name, phone number, email, and/or other identifying information). Later, that account holder initiates a phone call with that organization to access their account with that organization, to raise an issue with customer service, or accesses sensitive information related to the account holder (e.g., update a PIN number or password, freeze or unfreeze a credit card, obtain insurance policy information, etc.). The organization's caller verification system can look up the designated agent and request that the agent verify the account holder's identity. If the designated agent verifies the account holder's identity, the account holder and organization's representative can proceed with the call. However, if the designated agent does not verify the account holder's identity (i.e., if the agent contacts the account holder and learns that the account holder is not on the phone with the organization), the organization's caller verification system can deny the caller access to the account holder's account. In this manner, the caller verification system implements a multi-user authentication process that can prevent unauthorized third parties (e.g., scammers, hackers, financial criminals, etc.) from accessing an account holder's account over the phone.

In an example implementation, the account verification system can operate over a traditional public switched telephone network (PSTN). For example, the organization's phone system can be configured to receive incoming calls through a conference line or bridge system that allows for three or more parties to participate in a phone call simultaneously. In this implementation, an incoming call can trigger the caller verification system to query a database, make an application programming interface (API) call, or otherwise determine the caller's expected identity based on the phone number and/or caller ID information. If an account linked to the caller is found, the caller verification system can perform a subsequent query, API call, or other lookup to determine who the account holder's designated agent is and retrieve the agent's contact information on record. Once the call is established between the caller and the organization's phone system, the caller verification system can be triggered by the organization's representative to dial in the account holder's designated agent. If the agent joins the call, the agent and caller can talk to each other, thereby giving the agent a chance to determine if the caller is in fact the account holder.

For instance, if the agent is the spouse of the account holder, then the agent should be able to quickly tell if the caller is their spouse based on the sound of their voice and asking a few basic questions. Similarly, if the agent is related to the account holder, cohabitates with the account holder, or otherwise has a close relationship with the account holder, it should be relatively easy for agent to verify the caller's identity.

In implementations where authentication occurs through verbal communication over a phone call, the agent can verbally verify the caller's identity to the organization's representative. In some cases, the caller verification system may prevent the organization's representative from accessing the account holder's account until the agent has positively verified the caller's identity (e.g., a prompt that forces the representative to confirm that the agent has verified the caller, an input that requires the representative to enter a verbal password provided by the agent, etc.). In various embodiments, the caller verification system can restrict the caller's access to a user account unless and until that user account's designated agent provides explicit authorization. Once the agent has verified the caller's identity, the caller verification system can update aspects of the call data (e.g., the caller ID reported to the representative, a status indicator within an application running on the representative's computer, etc.) to indicate to the agent that the account holder has been successfully verified.

In some embodiments, the caller verification system can request verification of the caller's identity by the designated agent through channels other than the telephone call. For example, caller verification system can transmit an SMS message to the agent's phone number of record and/or an email to the agent's email address of record requesting that the agent verify the caller (e.g., by responding to the SMS message with a "YES" or "NO," by clicking a link in the email triggering a REST API call, etc.). In some scenarios, the agent may be able to authenticate the caller without needing to join the phone call, such as when the agent and caller are collocated at the time of the call (e.g., family members in the same household, spouses, roommates, etc.). In other scenarios, the agent may join the call to briefly chat with the caller to verify their identity before completing the verification process via SMS, email, or by invoking a verification hyperlink.

In embodiments where caller verification occurs through digital, non-telephonic means, the caller verification system can restrict the representative's access to the expected user's account (e.g., using access control lists, database or file permissions, etc.), thereby preventing the representative from accidentally sharing sensitive information or providing unauthorized access to the user's account. Upon receiving the caller verification from the agent, the caller verification system can unlock or otherwise grant the representative access to the user's account. In this manner, digital access controls can enhance user account security both by preventing unauthorized users from using stolen information to falsely pose as another person before an organization, and by preventing an organization's representative from mistakenly or accidentally providing unauthorized individuals access to user accounts.

In some implementations, a caller verification system can interface directly with an organization's web application and/or mobile application(s) to facilitate agent-based user authentication. For instance, an account holder and their designated agent might both download an organization's mobile application on their respective devices and login to their respective accounts with that organization. If the account holder initiates a phone call with the organization, the caller verification system can invoke a function, subroutine, or other feature of the organization's mobile application on the agent's device. For example, the caller verification system can cause the agent's mobile application to generate a push notification requesting that the agent verify the caller's identity. The agent may respond to the push notification with a quick response (e.g., approve or deny), or may open the mobile application to obtain additional information about the request, such as the caller's phone number, caller's approximate location, etc. In some cases, the mobile application can interface with the organization's phone system, such that the agent can elect to join the in-progress call with the click of a button (e.g., which might trigger a dial—in sequence to join a conference call, join a voice-over-IP (VOIP) call, etc.).

In addition to the above-described conveniences, the organization's mobile application can implement digital authentication processes to verify the agent's identity (e.g., username and password login, OAuth, biometric verification, etc.). Thus, performing agent-based caller verification through a mobile application may be preferable over other methods, in part because it provides additional layers of security with respect to authenticating the identity of the agent.

The techniques of the present disclosure can also be used to authorize a caller's specific action. As described herein, the term "authenticate" generally refers to a process for verifying the identity of a caller, whereas the term "authorize" generally refers to a process in which an agent grants permission to a caller to perform some action with respect to their account with an organization. For the purposes of this application, the term "verification" broadly encompasses both positive authentication of a caller's identity and approval by a user's agent to allow the user to perform a particular action.

As a specific example, an adolescent may be an account holder with an auto insurance agency, and the adolescent's parent may be designated as their agent. The caller verification system may be configured to require approval by the parent before allowing the adolescent to change their auto insurance plan. Thus, if the adolescent calls the auto insurance company and asks to update their auto insurance plan, the caller verification system can request that the designated agent (the parent) first authorize the caller (the adolescent) to do so. If the parent does not authorize the request, then the caller verification system would not allow the representative to carry out the adolescent's request-even if the adolescent's identity has been successfully verified. In this manner, a parent, guardian, person with power of attorney, or other agent can authorize requests made by children, person with disabilities or medical conditions, elderly persons, and/or other account holders who may be the recipient of a product or service offered by an organization but is not legally competent to manage the account themselves.

If an account holder is either not authenticated by their designated agent, or is not authorized to perform a particular action by their designated agent, the caller verification system may perform one or more actions to mitigate potential security risks. For example, the caller verification system can automatically terminate the phone call with the unauthenticated caller to prevent any additional further of information between the organization's representative and the caller. In some cases, the caller verification system can automatically lock or freeze the account holder's account and notify the user that those security measures were taken due to a detected attack on their account by an unauthorized third party. In various embodiments, the caller verification system can notify the user of the attempt to access to their account (e.g., via SMS, email, push notification, and/or other notification means). The caller verification system can transmit similar notifications to the user's designated agent to further ensure that the user is quickly notified of the prevented attempt to access their account.

Embodiments of the present disclosure notably improve upon existing schemes of manual identity verification-such as caller ID and verification questioning—by providing a caller verification system that enables interfacing with a trusted third party device as an external authenticator. Where caller ID can be spoofed, and verification questions can be correctly answered with knowledge derived from other hacks or social engineering, the caller verification system can rely on a trusted third party device operated by a designated agent to provide an additional layer of security that makes it much more difficult for a hacker or identity thief to fraudulently pass off as an authentic account holder. By combining the agent's external verification with a digital access control system of an organization, the caller verification system provides technological improvements over existing telephone systems that are prone to human error and social engineering.

Embodiments of the present disclosure address a key deficiency of existing credit information authorization systems by dynamically updating the permissions of each accessor without requiring human intervention. Human errors-such as failures to securely store sensitive user information, failures to keep cybersecurity systems up to date, and maintaining records of user authorizations for extended periods of time—are often the root cause of cybersecurity breaches. Using a secure, trusted intermediary to authenticate users, accessors, and delegates provides a more secure approach to identity verification compared to the traditional multiple-choice security question method. In addition, dynamically updating and automatically deauthorizing accessors without human intervention significantly reduces a user's exposure to identity theft. It would be virtually impossible to provide an analogous service to hundreds of millions of people without an automated, computerized approach to managing access control to a user's credit information.

For the purposes of this disclosure, the term "designated agent" refers to an individual or entity that is appointed by an account holder to serve as an external authenticator and/or authorizer for that account holder. The agent may be designated, appointed, or otherwise specified by the account holder, and information about the agent may be stored in relation to the account holder's user account (e.g., the agent's phone number, email, user ID (if they have their own user account with the organization), etc.). Contact information about an agent can be used to facilitate making phone calls via PSTN, text messages via PSTN, VoIP calls, digital messaging, email, and/or communication through specific application(s) on the agent's device(s).

As described herein, the terms "bridging" and "conferencing" may be used interchangeably to refer processes for establishing a multi-way phone or voice call between three or more parties. In some cases, a caller may be "bridged" or forwarded from one call context to another call context using conventional PSTN call transfer mechanisms. In other cases, a caller may join a conference line that facilitates a phone call across multiple callers. In yet other implementations, a caller may join a voice call in a VoIP application, which can include more than two simultaneous participants to digitally emulate a conventional conference line. Regardless of the particular implementation, a third party to a call can be bridged, conferenced, added, or otherwise join an existing call between two participants.

As described herein, an "expected" caller identity may describe a predicted identity of a caller based on information automatically determined about the caller, such as their phone number and/or caller ID information (e.g., derived from CNAM lookup). The phone number and/or caller ID may be used to query an organization's user accounts to determine if the caller information matches an existing account. While such lookups can be performed to predict the caller's identity, this determined identity is considered an "expected" identity because it has not been authenticated through a secondary authentication process. For example, a caller's expected identity may be that of a matching account holder, but is later determined to be incorrect if the account holder's designated agent is unable to verify the caller. Accordingly, an "expected identity" serves as an initial input into a subsequent authentication process, but is only considered the caller's actual identity if that authentication process verifies that the caller is in fact the initially predicted account holder.

As described herein, the term "sensitive information" generally refers to any data or information that is maintained, stored, and/or updated by an organization in association with individuals that is intended to be secured and only privately accessible by a limited group of individuals. Sensitive information may include personal information about the individual or entity (e.g., full name, address, date of birth, SSN, etc.), account credentials (e.g., username, password, MFA configuration, etc.), and other possible information.

In addition, while the term "account holder" is used to describe the user of an account that is the subject of an authentication or authorization process, it will be appreciated that a designated agent may themselves be a separate account holder with the same organization. For instance, two spouses might designate one another as each other's designed agent for their auto insurance plans, with each spouse having their own account with the insurance company. In other cases, a parent might specify their child as a designated agent, even if that child does not have their own account with the organization. Thus, the terms "account holder" and "designated agent" are used to describe the roles of particular individuals undergoing a particular authentication process, even though the roles may differ across different contexts or organizations.

Several implementations are discussed below in more detail in reference to the figures. FIG. 1 is a block diagram illustrating an overview of devices on which some implementations of the disclosed technology can operate. The devices can comprise hardware components of a device 100 that verifies a caller's identity and/or permits a caller's access to a user account based on a designated agent's authorization. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, credit information access manager 164, and other application programs 166. Memory 150 can also include data memory 170, e.g., account data, designated agent information, user account permissions, account verification application(s), permissions data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
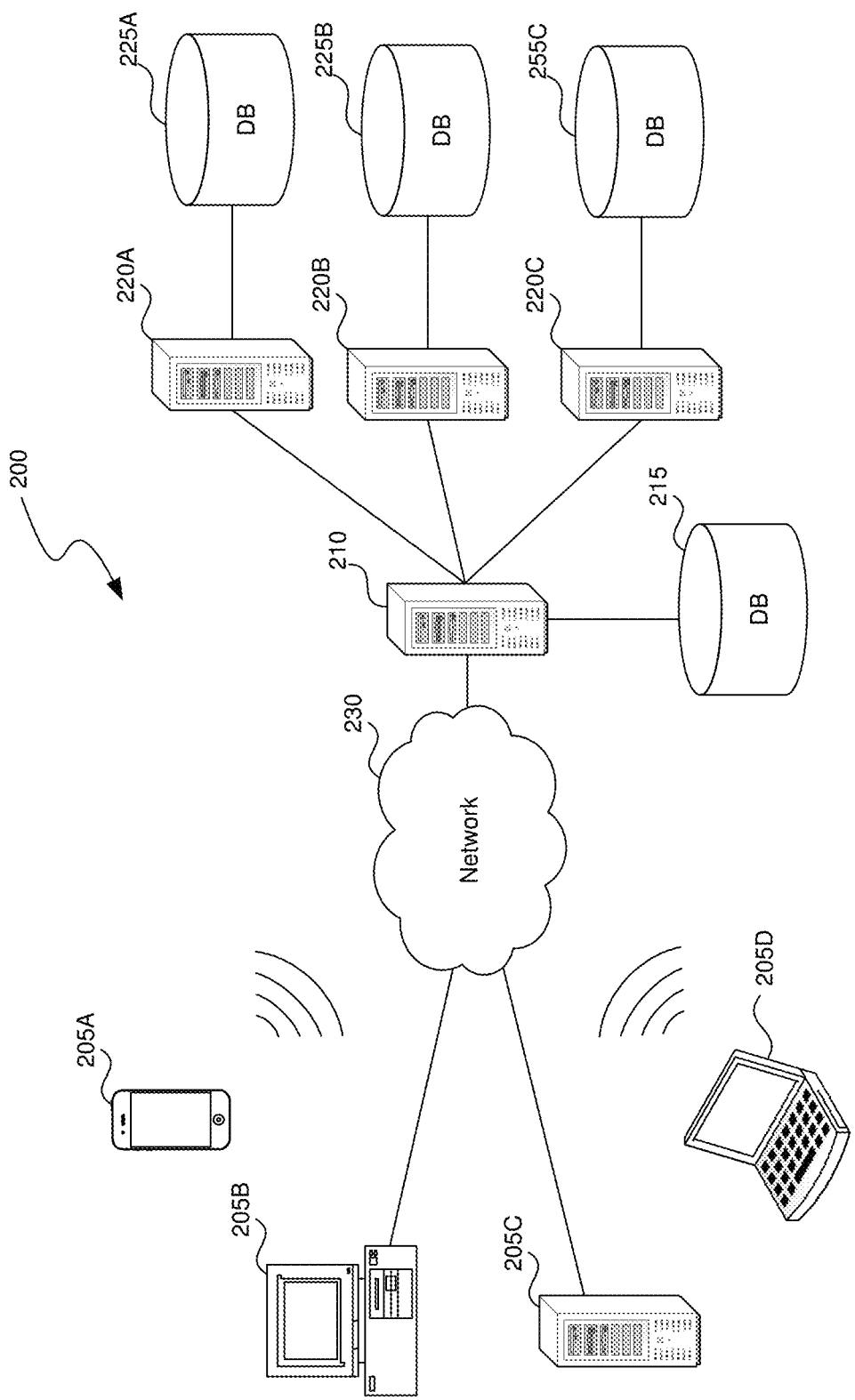
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as account data, designated agent information, user account permissions, account verification application(s), permissions data, configuration data, settings, user options or preferences, which may be on one or more databases for the credit information access manager 164. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
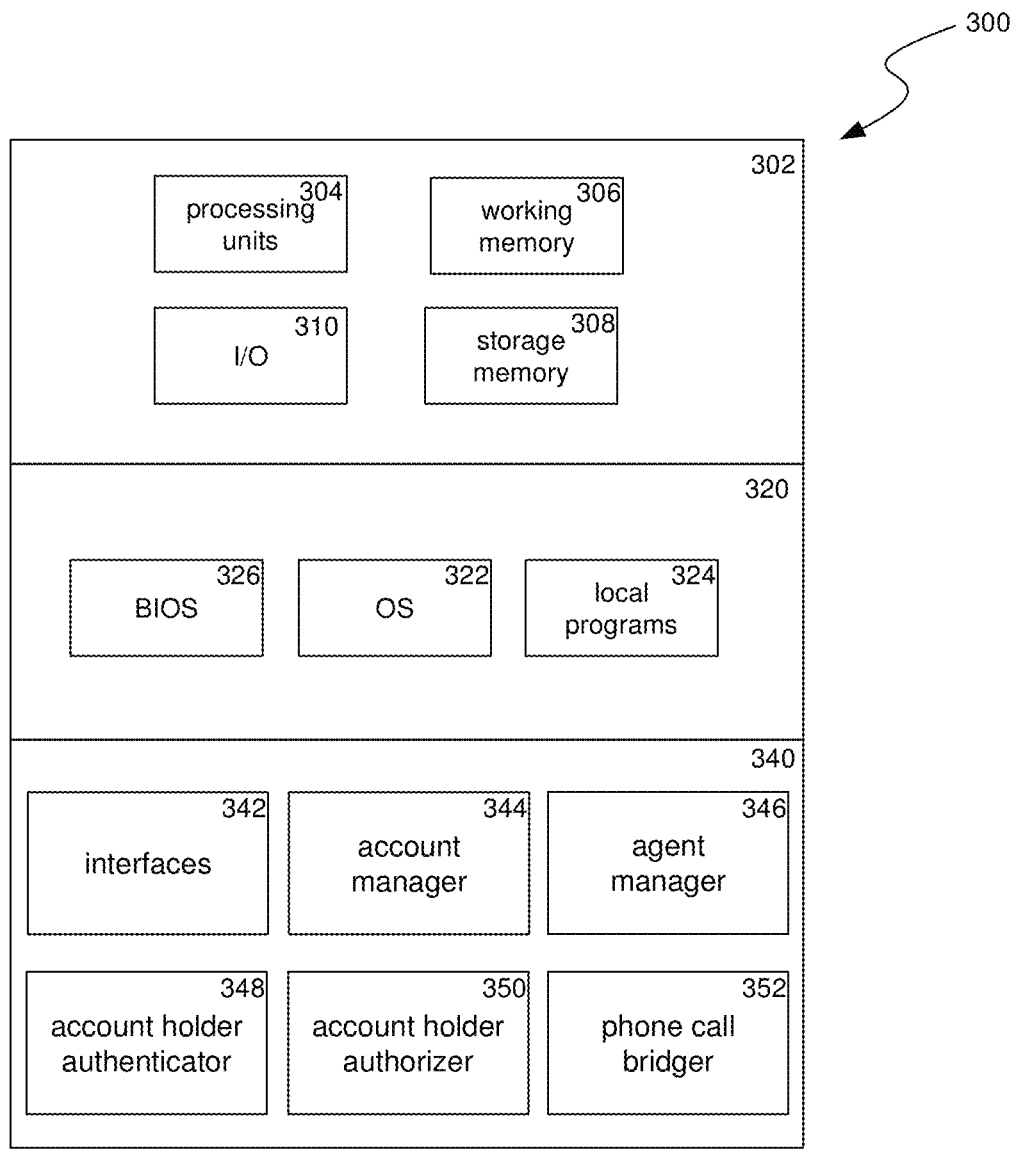
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include account manager 344, agent manager 346, account holder authenticator generator 348, account holder authorizer 350, phone call bridger 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Account manager 344 can store and update credentials, metadata, preferences, and other data associated with accounts for users and/or agents. For example, account manager 344 may store account data when a user or agent creates a new account with a caller verification system (e.g., name, address, phone number, email, other contact information, etc.). In addition, account manager 344 can help facilitate the authentication of users and/or agents when they interface with the caller verification system via an application. For instance, a user may be authenticated using some combination of a username and password, biometric verification (e.g., facial identification, fingerprint identification, etc.), MFA (e.g., an authentication code), and/or other means of authentication. In some cases, one or more authentication methods may be performed on a client device of a user or agent (e.g., biometric identification). Account manager 344 may permit a user or agent to access their account with an organization to the extent that account holder authenticator 348 has received verification of a caller's identity and/or that account holder authorizer 350 has received approval of a caller's action with respect to their user account. Additional details on controlling a caller's access to a user account are provided below with respect to account manager 612 of FIG. 6.

Agent manager 346 can facilitate the registration, onboarding, and maintenance of agents with respect to their associated user accounts. Agent manager 346 can store contact information for each agent to enable contacting the agent across one or more modes of communication (e.g., phone call, text message, email, application messaging, etc.). In some implementations, agent manager 346 can store preferences about each agent, such as their preferred method of communication and availability. Agent manager 346 can interface with phone call bridger 352 to facilitate the automatic dialing of a user's designated agent, and/or the joining of an agent to an existing phone call or conference between a caller and an account manager. Agent manager 346 can also interface with account holder authenticator 348 and/or account holder authorizer 350 to facilitate caller identity verification and/or authorization of certain actions by an account holder. In some embodiments, caller authentication and/or authorization may involve digital communication between an agent's device and agent manager 346, which can then pass requests, credentials, and/or other messages to account holder authenticator 348 and/or account holder authorizer 350 to perform an authentication or authorization process.

Account holder authenticator 348 can facilitate the authentication of a caller's identity. In some embodiments, account holder authenticator 348 can define rules, conditions, and/or processes sufficient to verify a caller's identity. For example, account holder authenticator 348 can await manual input from a representative of an organization once they receive verbal confirmation from a designated agent that the caller is the account holder. As another example, account holder authenticator 348 can wait for a message, API call, or request from a designated agent's device indicating that the caller is the account holder. Account holder authenticator 348 can also interface with account manager 344 to update permissions and/or to enable read or write access to user account information.

Account holder authorizer 350 can facilitate the authorization of a caller's requested action. In some embodiments, account holder authorizer 350 can define rules, conditions, and/or processes sufficient to authorize a caller's action. For example, account holder authorizer 350 can await manual input from a representative of an organization once they receive verbal authorization from a designated agent approving a caller's action. As another example, account holder authorizer 350 can wait for a message, API call, or request from a designated agent's device indicating the approval of the agent to allow the account holder to perform a particular action. Account holder authorizer 350 can also interface with account manager 344 to update permissions and/or to enable read or write access to various aspects of a user's account, thereby implementing access control to limit the actions that an account holder can perform unless authorized by their designated agent.

Phone call bridger 352 can facilitate the establishment of phone calls, generate phone contexts, create conference calls, dial in additional parties to a phone call, and/or otherwise facilitate a multi-way conversation between an organization's representative, a caller, and an agent. In some implementations, phone call bridger 352 may include a conference line service that enables multiple callers to join into the same phone call. In other implementations, phone call bridger 352 can leverage software development kits (SDKs), APIs, and/or other digital technologies to implement an application or service that receives incoming phone calls, dials designated agents, joins calls, automatically terminates calls if authentication is unsuccessful, and/or any other business logic. In some cases, phone call bridger 352 can interface with legacy PSTN systems and with digital voice communication systems to implement automated multi-way calling.

In some cases, phone call bridger 352 can trigger functions to run on mobile applications of a caller and/or an agent. For instance, phone call bridger 352 can use native mobile operating system (OS) APIs to implement custom call interfaces with user interface (UI) elements specific to a particular application. An example UI that interfaces with phone bridger 352 is shown and described below with respect to FIG. 8A.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
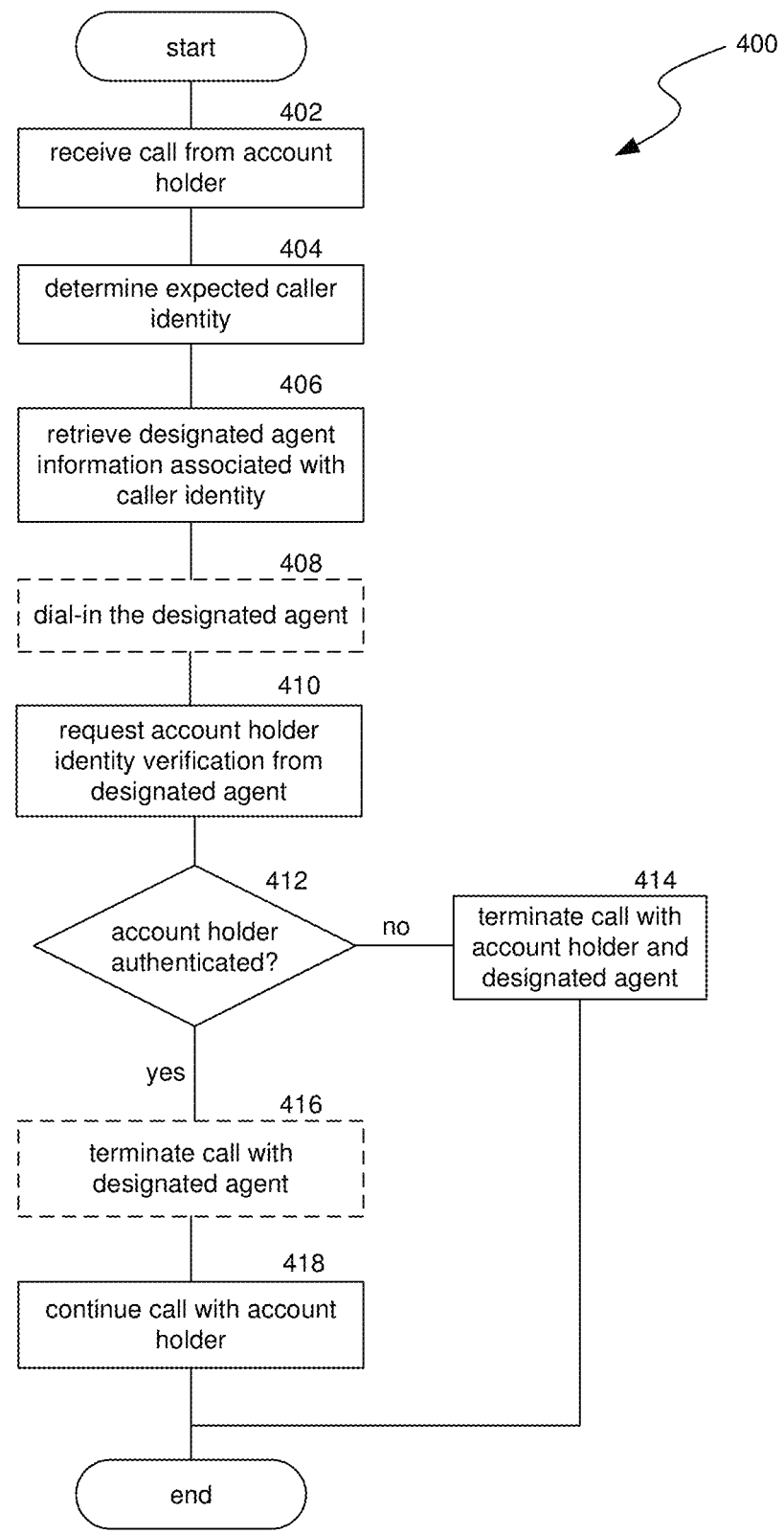
FIG. 4 is a flow diagram illustrating a process used in some implementations for authenticating an account holder via a designated agent.

FIG. 4 is a flow diagram illustrating a process 400 used in some implementations for authenticating an account holder via a designated agent, some or all of which may be performed by caller verification system 164, account holder authenticator 348, caller verification system 610, organization system 706, and/or other implementations of the present disclosure's caller verification systems. Operations described with respect to process 400 can be performed by one or more servers (e.g., cloud servers) that communicate with one or more client devices to facilitate user authentication and authorization. Process 400 may begin when a user initiates a telephone call or VoIP call with an organization. In some implementations, process 400 can performed in response to determining that the caller ID or phone number of a caller matches (exactly or approximately) a particular individual, company, or institution, such as an account holder maintained by account manager 344. For the sake of brevity, operations of process 400 are described as being performed by caller verification system 164.

At block 402, process 400 receives a call from a device that appears to be associated with an account holder. For example, an incoming call may indicate a phone number that is associated with the account holder. However, given the possibility that the phone number is spoofed, process 400 does not consider the caller's identity to be authenticated. The incoming call can be over a traditional PSTN, or a VoIP call, depending on the particular implementation.

At block 404, process 400 determines the caller's expected identity. As described above, the caller's expected identity may be a user ID, user account, or account holder associated with the caller's phone number and/or caller ID. In some implementations, process 400 can make an API call, query a database, or otherwise search across a set of user accounts to determine if an existing user account matches the incoming caller information.

At block 406, process 400 retrieves designated agent information associated with the caller's expected identity. In some embodiments, designated agent information may be associated with, linked, or otherwise stored in connection with the user account associated with the expected identity of the caller. Block 406 may involve making an API call, querying a database, or otherwise searching for designated agent information that has been previously registered with the user account associated with the expected identity of the caller.

At block 408, process 400 can dial in the designated agent based on contact information included within the designated agent information. In some embodiments, process 400 can automatically dial in the designated agent based on a stored phone number for that designated agent. In other embodiments, process 400 can automatically generate a link or UI element that appears within an application running on the organization's representative computing device which prompts the representative to add the agent to the call. Process 400 may interface with programmable communication tools or web service APIs that enable customized logic for automatically generating conference calls, automatically dialing in additional parties to existing calls, prompting the representative to add a new caller without the representative having to manually dial in the agent, etc.

In some implementations, the caller verification system may be configured to transmit a digital request to the agent (e.g., SMS, email, push notification, etc.) to verify the caller's identity. For example, an agent may configure their settings to specify that email-based verification is preferred over other modes of communication. Such cases, the caller verification system may not necessarily attempt to add the designated agent to the call, but may instead generate a text message, email, or push notification and automatically transmit that message to the agent to request that they verify the caller. Such an arrangement may be preferable in circumstances where the caller informs the agent about the call prior to making the call, such that the agent is expecting to receive a request to verify the caller at a particular date or time.

At block 410, process 400 requests verification of the account holder's identity by the designated agent. In cases where the agent is dialed in and joins the call, process 400 can involve the representative requesting the agent verify the caller's identity by verbally answering "yes" or "no" (which may be heard by the agent, or interpreted using text-to-speech software). In some implementations, the agent may be asked to dial a number or a sequence of numbers to answer the question (e.g., dial 1 if you cannot verify the caller, or dial 9 to verify the caller), which might be received by the caller verification system to automatically trigger subsequent operations. For instance, if the caller dials number(s) to deny verification of the caller, the caller verification system might play an automated response and subsequently terminate the call. Alternatively, if the caller dials number(s) to verify the caller, the caller verification system might play an automated response to thank the designated agent and tell them that they are free to hang up.

In some cases, block 410 can involve transmitting a digital request to the agent to request that they verify the caller using a secure digital channel. For example, process 400 can automatically transmit an email with a verification link to the agent's email address, which may improve the security of process 400 by increasing the certainty that the agent themselves are authenticated (i.e., by requiring credentials to access the agent's email account). As another example, process 400 can transmit a push notification or other request to a mobile application associated with the organization, which itself requires that the agent be authenticated to access the features of the app. The notification may be received by the agent within the mobile application, which can be responded to in the negative to deny authentication to the caller, or affirmatively to verify the caller's identity.

At block 412, process 400 determines whether the designated agent verified the account holder's identity (i.e., authenticated the account holder), using any suitable method such as the various techniques described above. If the designated agent did not authenticate the caller's identity, process 400 proceeds to block 414. At block 414, process 400 terminates the call with the account holder and the designated agent.

Alternatively, if the designated agent authenticates the caller's identity, process 400 can proceed to block 416. At block 416, process 400 can terminate the call with the designated agent, since caller verification is now complete. In some implementations, the caller verification system may inform the agent that they can hang up at any time, but allow the agent to decide if they wish to stay on the call (e.g., if the agent is the parent and the caller is their child, if the agent plans to make subsequent authorization(s) for the caller, etc.). Then, at block 418, process 400 proceeds with the call with the account holder.

Figure 5:
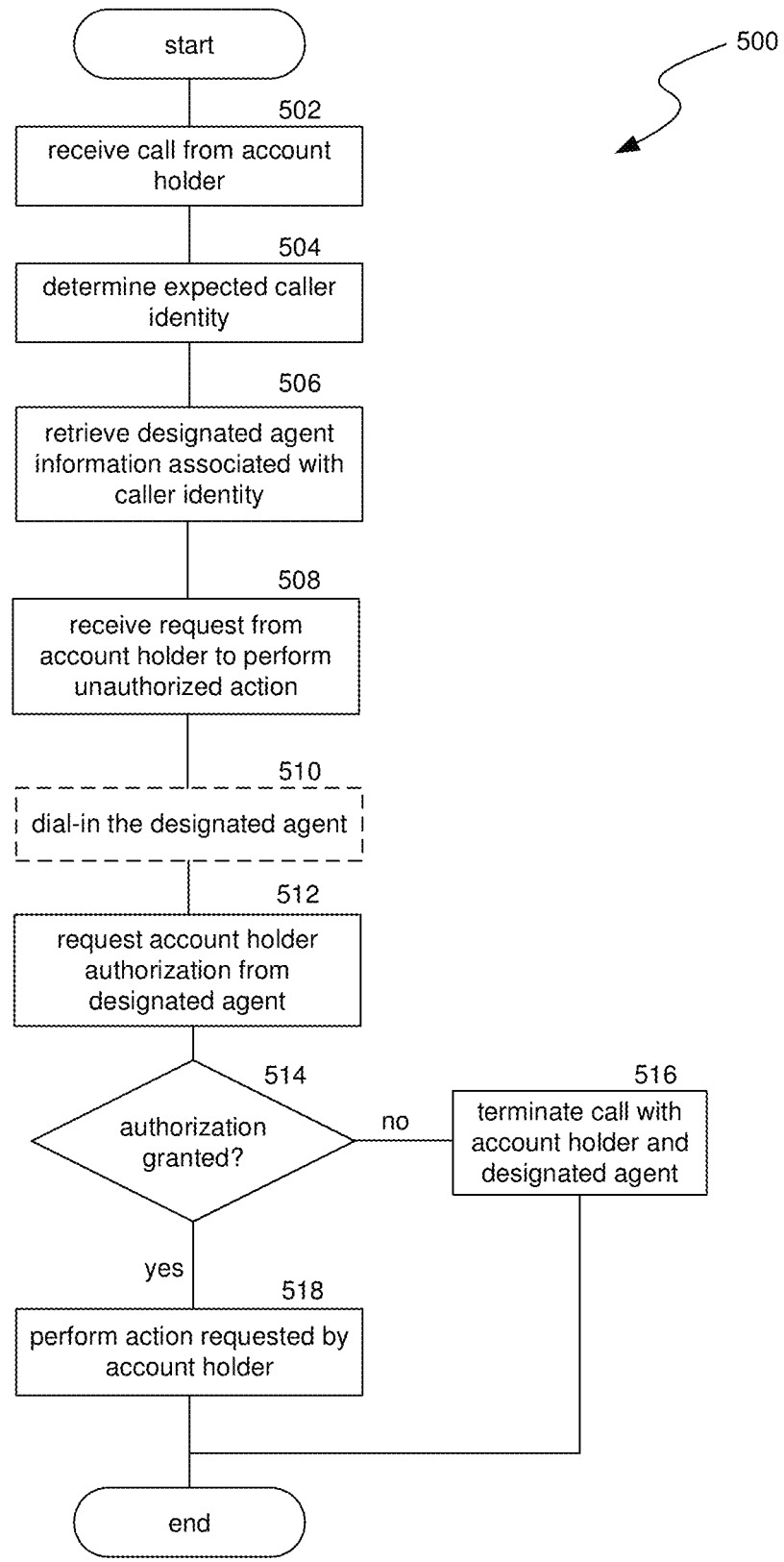
FIG. 5 is a flow diagram illustrating a process used in some implementations for authorizing an action by an account holder via a designated agent.

FIG. 5 is a flow diagram illustrating a process 500 used in some implementations for authorizing an action by an account holder via a designated agent, some or all of which may be performed by credit information access manager 164, account holder authorizer 350, caller verification system 610, organization system 706, and/or other implementations of the present disclosure's caller verification systems. Operations described with respect to process 500 can be performed by one or more servers (e.g., cloud servers) that communicate with one or more client devices to facilitate user authentication and authorization. Process 500 may begin when a user initiates a telephone call or VoIP call with an organization. In some implementations, process 500 can performed in response to determining that the caller ID or phone number of a caller matches (exactly or approximately) a particular individual, company, or institution, such as an account holder maintained by account manager 344. For the sake of brevity, operations of process 500 are described as being performed by caller verification system 164.

At block 502, process 500 receives a call from a device that appears to be associated with an account holder. Block 502 may be similar to or the same as block 402 described above with respect to FIG. 4.

At block 504, process 500 determines the caller's expected identity. Block 504 may be similar to or the same as block 404 described above with respect to FIG. 4.

At block 506, process 500 retrieves designated agent information associated with the caller's expected identity. Block 506 may be similar to or the same as block 406 described above with respect to FIG. 4.

At block 508, process 508 receives a request from the account holder to perform an unauthorized action. In some embodiments, the caller verification system can store user account permissions (e.g., access control lists (ACLs), security rules, role-based authorizations, identity and access management (IAM) configurations, etc.) which dictate the action(s) that the user is allowed to perform with and without authorization by the designated agent. For example, the user account permissions can specify that any request by the account holder to access their sensitive information requires authorization by the designated agent (e.g., to enable a parent to prevent their child's sensitive information from being compromised, to enable an adult to prevent their elderly parent's sensitive information from being compromised, etc.). The caller verification system may deem an action requested by the caller to be "unauthorized" until their designated agent approves of the action, even if the caller's identity has already been authenticated.

At block 510, process 510 can dial in the designated agent based on contact information included within the designated agent information. Block 510 may be similar to or the same as block 408 described above with respect to FIG. 4.

At block 512, process 500 requests authorization of the account holder's action by the designated agent. The request for authorization may be made over the phone, or via digital means as described above. Then, at block 514, process 500 determines whether the designated agent authorized the account holder's action (i.e., granted the user permission to perform the particular action). If the designated agent did not authorize the caller's action, process 500 proceeds to block 516. At block 516, process 500 terminates the call with the account holder and the designated agent. Block 516 may be similar to or the same as block 414 described above with respect to FIG. 4.

Alternatively, if the designated agent authorizes the caller's action, process 500 can proceed to block 518. At block 518, process 500 performs the action request by the account holder, which has now been authorized by the designated agent. For example, if the account holder requested to change a password, PIN number, security phrase, or other security measures associated with their account, the caller verification system can update that security measure. In some implementations, the caller verification system can restrict an organization's representative from updating the account holder's account until the agent has granted authorization. In this manner, the security of the user's account is substantially improved. The authorization to update the user's account may be limited to the duration of the phone call, such that the user's account automatically returns to being in a "locked" or unauthorized state once the call terminates.

Figure 6:
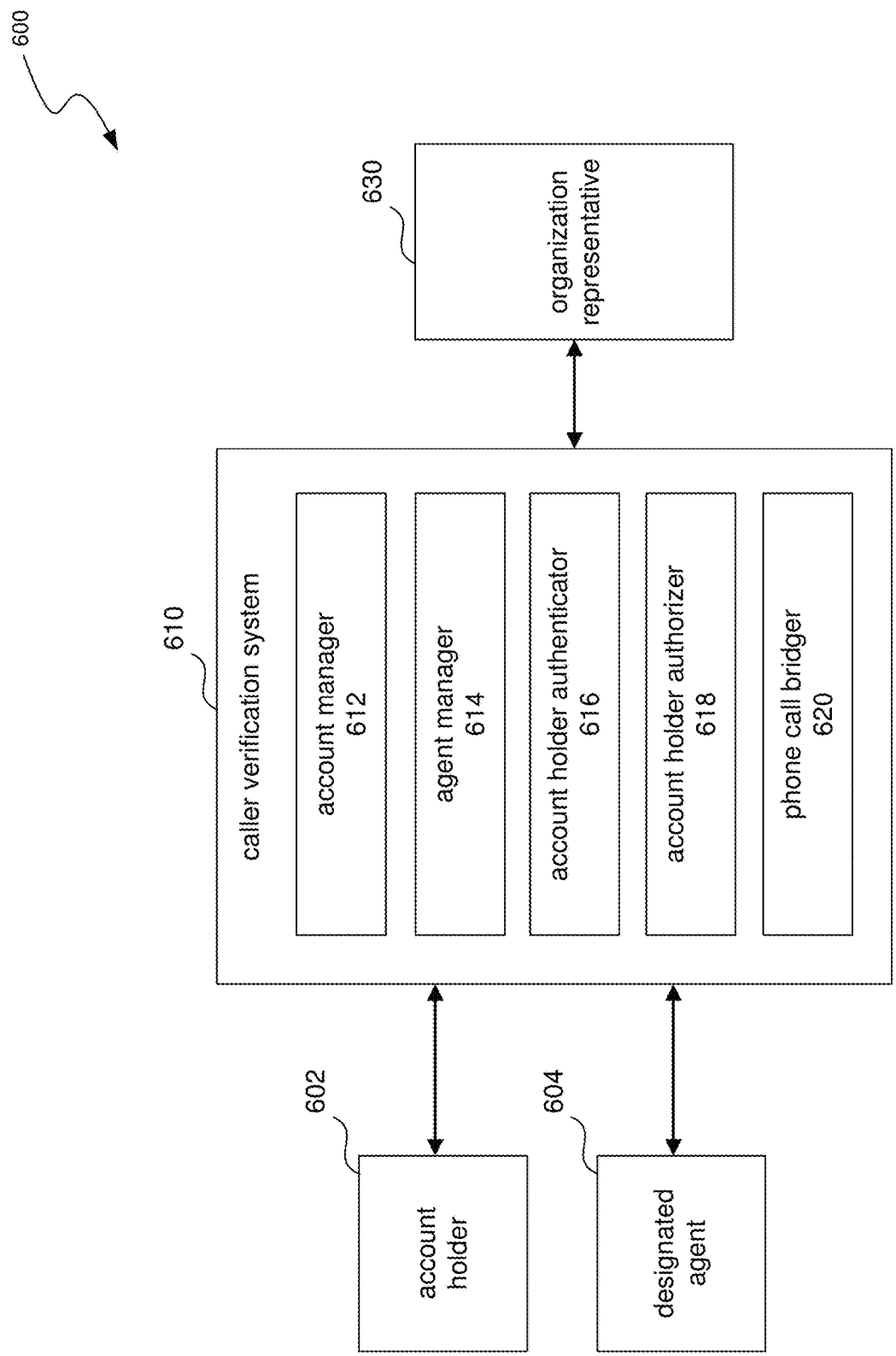
FIG. 6 is a conceptual diagram illustrating an example system for managing the authentication and authorization of an account holder before an organization using a designated agent.

FIG. 6 is a conceptual diagram 600 illustrating an example system for managing the authentication and authorization of an account holder before an organization using a designated agent. The system includes caller verification system 610, which may be similar to or the same as caller verification system 164. Caller verification system 610 can serve as an intermediary between account holder 602, designated agent 604, and organization representative 630 by preventing an organization's representative from accessing or altering account holder's 602 information without authentication and/or authorization by designated agent 604. In this example, account manager 612 may be similar to or the same as account manager 344, agent manager 614 may be similar to or the same as agent manager 346, account holder authenticator 616 may be similar to or the same as account holder authenticator 348, account holder authorizer 618 may be similar to or the same as account holder authorizer 350, and phone call bridger 620 may be similar to or the same as phone call bridger 352.

As illustrated in FIG. 6, access to an account holder's account is mediated through caller verification system 610. Phone call bridger 620 can facilitate a telephonic or VoIP call among account holder 602, organization representative 630, and/or designated agent 604. In some implementations, information provided verbally or digitally by account holder 602 and/or designated agent 604 can be moderated, redacted, or otherwise limited by modules caller verification system 610 to enhance the security of the user authentication process. For example, a keypad-based PIN code provided by designated agent 604 indicating the designated agent's authentication of account holder 602 can be filtered by caller verification system 610 to prevent account holder 602 and/or organization representative 630 from hearing the tones and learning the PIN code. As another example, digital authentication and/or authorization provided by designated agent 604 may be processed by account holder authenticator 616 and/or account holder authorizer 618, without involving account holder 602 or organization representative 630. In this manner, caller verification system 610 can reduce the vulnerabilities associated with traditional phone systems, whereby authorization and/or authentication can be facilitated without openly sharing the communication with all parties to the call.

In addition, because caller verification 610 manages communication between account holder 602, designated agent 604, and organization representative 630, caller verification system 610 can automatically initiate and terminate parties to the phone call, thereby reducing the chance of human error in an authentication or authorization process. For example, if designated agent 604 is unable to identify a caller claiming to be account holder 602, caller verification system 610 can terminate the call in response to the designated agent's 604 failure to authenticate the caller. Accordingly, organization representative 630 can be automatically prevented from mistakenly or maliciously proceeding with the call.

Figure 7A:
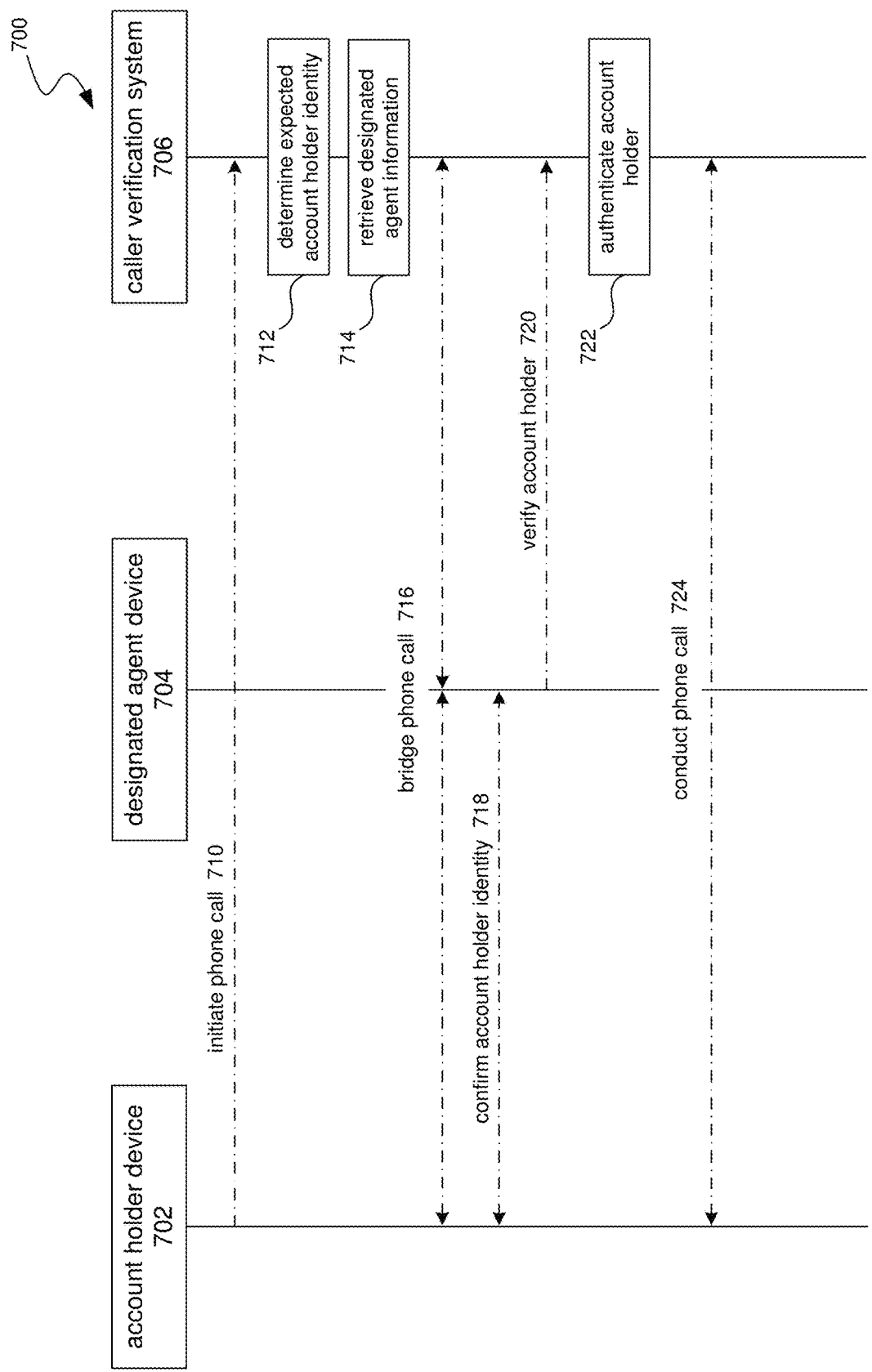
FIG. 7A is a sequence diagram of operations performed by devices for telephonically authenticating an account holder using a multi-way call with a designated agent.
Figure 7B:
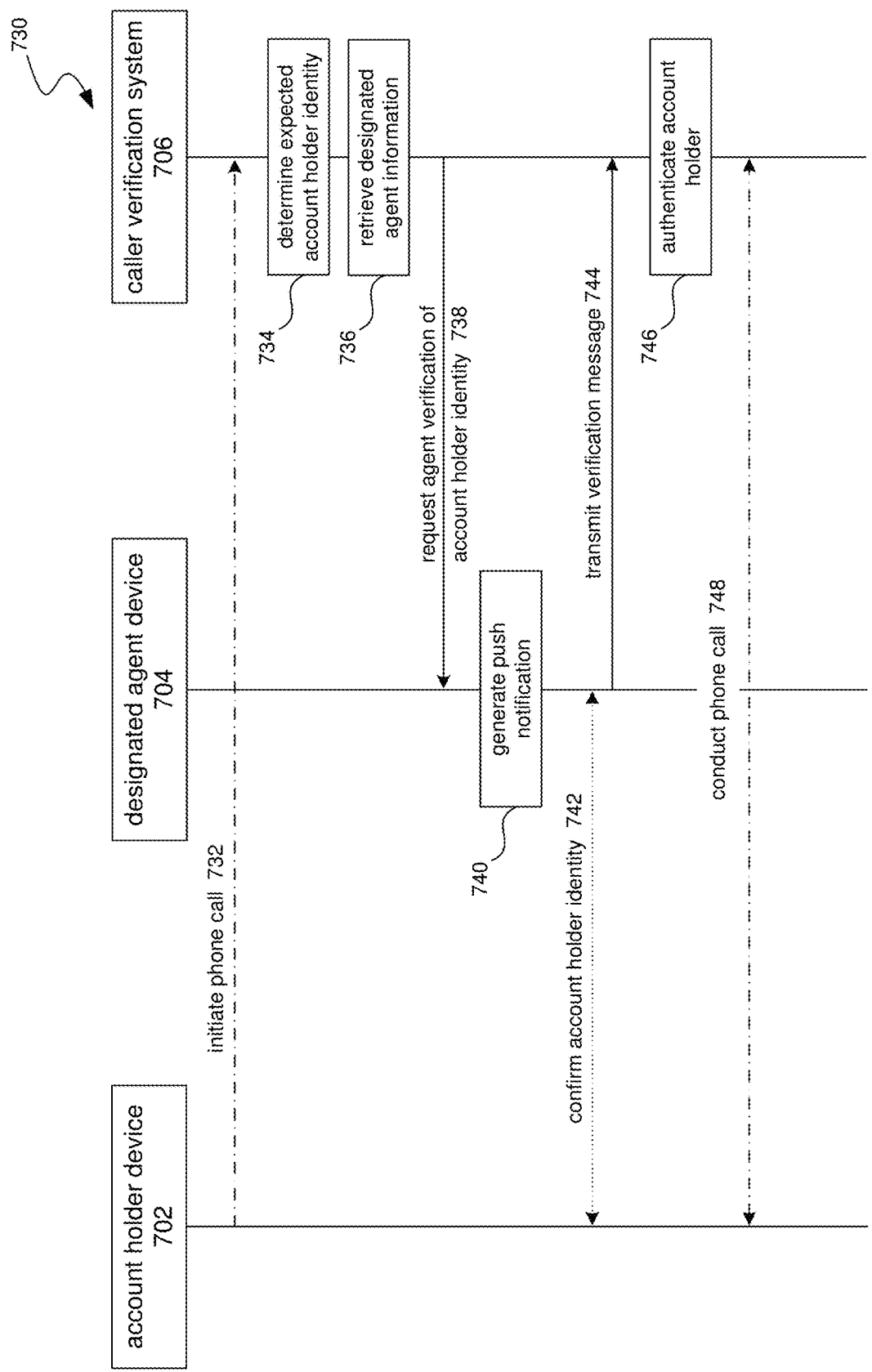
FIG. 7B is a sequence diagram of operations performed by devices for digitally authenticating an account holder via a designated agent.

FIGS. 7A and 7B illustrate sequence diagrams of operations performed by account holder device 702, designated agent device 704, and caller verification system 706 associated with an organization. With respect to FIGS. 7A and 7B, horizontal lines with alternating dots and dashes represent telephonic communication (e.g., a PSTN or VoIP phone call), whereas solid lines denote digital communication (e.g., HTTP or HTTPS communication over the Internet).

FIG. 7A is a sequence diagram 700 of operations performed by devices for telephonically authenticating an account holder using a multi-way call with a designated agent. Account holder device 702 begins at step 710 by initiating a phone call with caller verification system 706. At step 712, caller verification system 706 determines the expected account holder identity (e.g., based on a phone number or caller ID lookup with an account manager). Then, at step 714, caller verification system 706 retrieves designated agent information associated with the account holder. Based on the designated agent information, caller verification system 706 bridges the phone call to dial in designated agent device 704 at step 716. At step 718, account holder device 702 and designated agent device 704 communicate directly to enable the designated agent to verify the caller's identity.

At step 720, designated agent device 704 telephonically verifies that the caller is the expected account holder. In response to receiving that verification, caller verification system 706 authenticates the caller as the account holder at step 722. With the authentication process being completed, account holder device 702 and caller verification system 706 can continue the phone call at step 724. In this manner, the account holder can be telephonically verified by a third party agent.

FIG. 7B is a sequence diagram 730 of operations performed by devices for digitally authenticating an account holder via a designated agent. Account holder device 702 begins at step 732 by initiating a phone call with caller verification system 706. At step 734, caller verification system 706 determines the expected account holder identity. Then, at step 736, caller verification system 706 retrieves designated agent information associated with the account holder. While the phone call is ongoing, and based on the retrieved designated agent information, caller verification system 706 transmits a request to designated agent device 704 at step 738 to verify the account holder's identity.

In this implementation, designated agent device 704 has installed thereon a mobile application that digitally interfaces with caller verification system 706. Upon receiving the request at step 738, designated agent device 704 generates a push notification at 740. The push notification can include information to inform the designated agent about the request, such as the caller's expected identity and when the request was made. In some cases, the push notification can allow the agent to optionally join the call (e.g., if the agent was unaware that the account holder was planning to call the organization). In this example, at step 742, designated agent device 704 and account holder device 702 independently communicate to allow the agent to verify the caller's identity (e.g., a text message or email from the agent to the account holder asking if they are on the phone with the organization).

Once the designated agent has verified the caller's identity, designated agent device 704 can transmit a verification message to caller verification system 706 at step 744. The transmission may be facilitated by the mobile application, in some cases (e.g., generating a signed message with a payload configured by the mobile application and sending that payload via an HTTPS request to a server of caller verification system 706). In response to receiving the verification message, caller verification system 706 authenticates the account holder at step 746. Then, with the account holder verification being completed, account holder device 702 and caller verification system 706 can continue the phone call at step 724. In this manner, the account holder can be digitally verified by a third party agent, without necessarily having to join a conference call with the account holder and the organization.

Figure 8A:
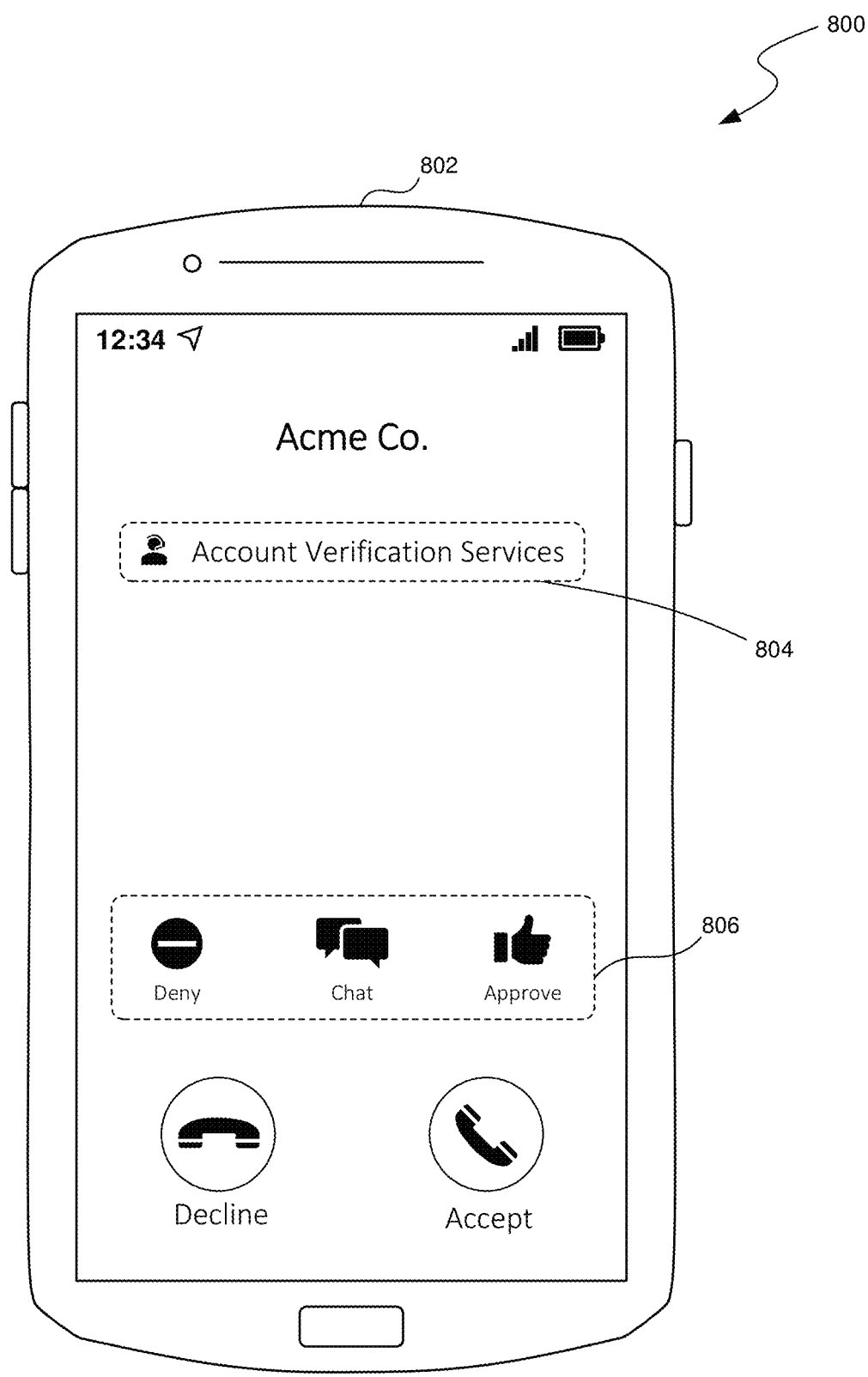
FIG. 8A is a diagram illustrating an example user interface for a designated agent device receiving an incoming call to authenticate an account holder.
Figure 8B:
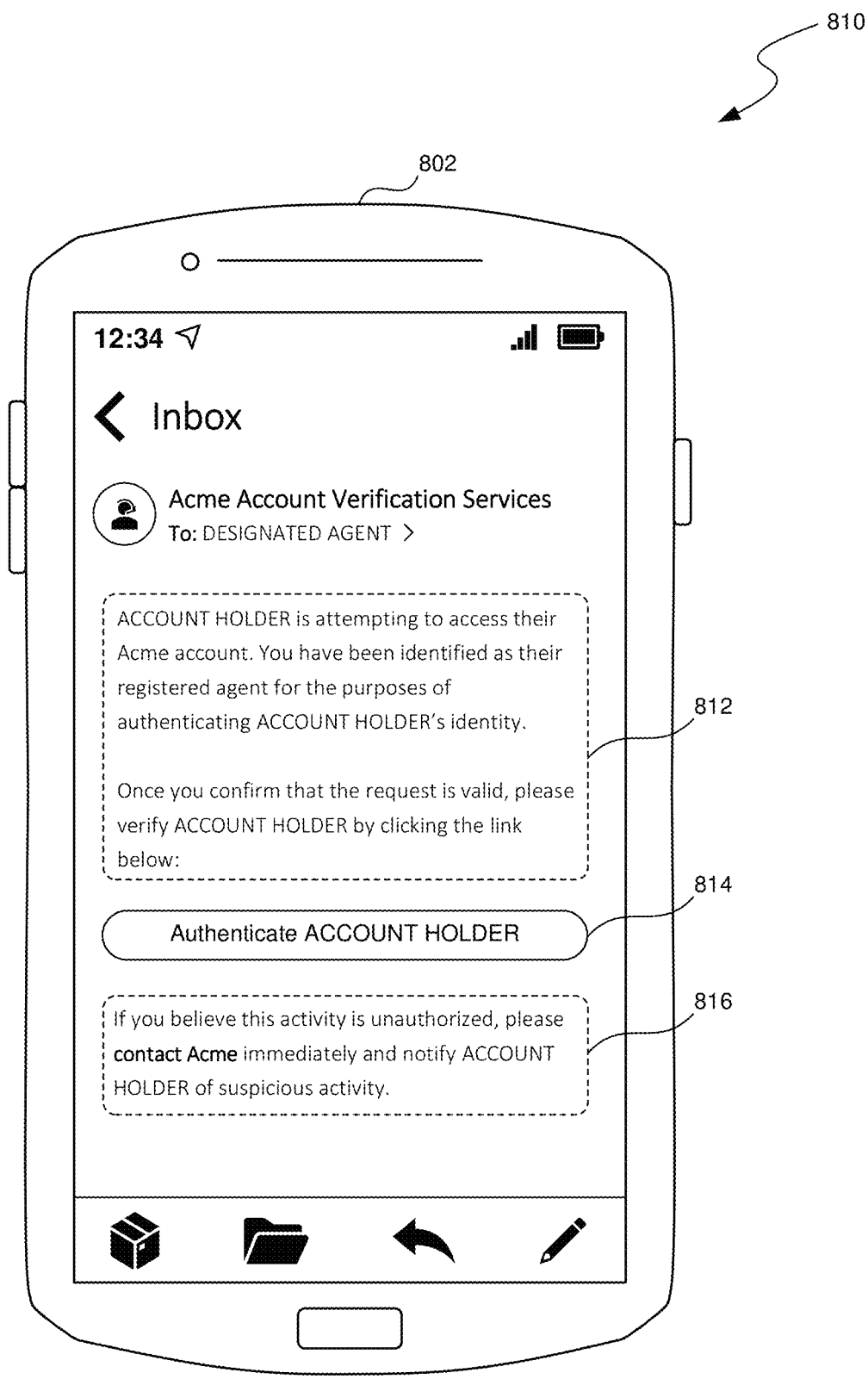
FIG. 8B is a diagram illustrating an example user interface for a designated agent device receiving an email to authenticate an account holder.
Figure 8C:
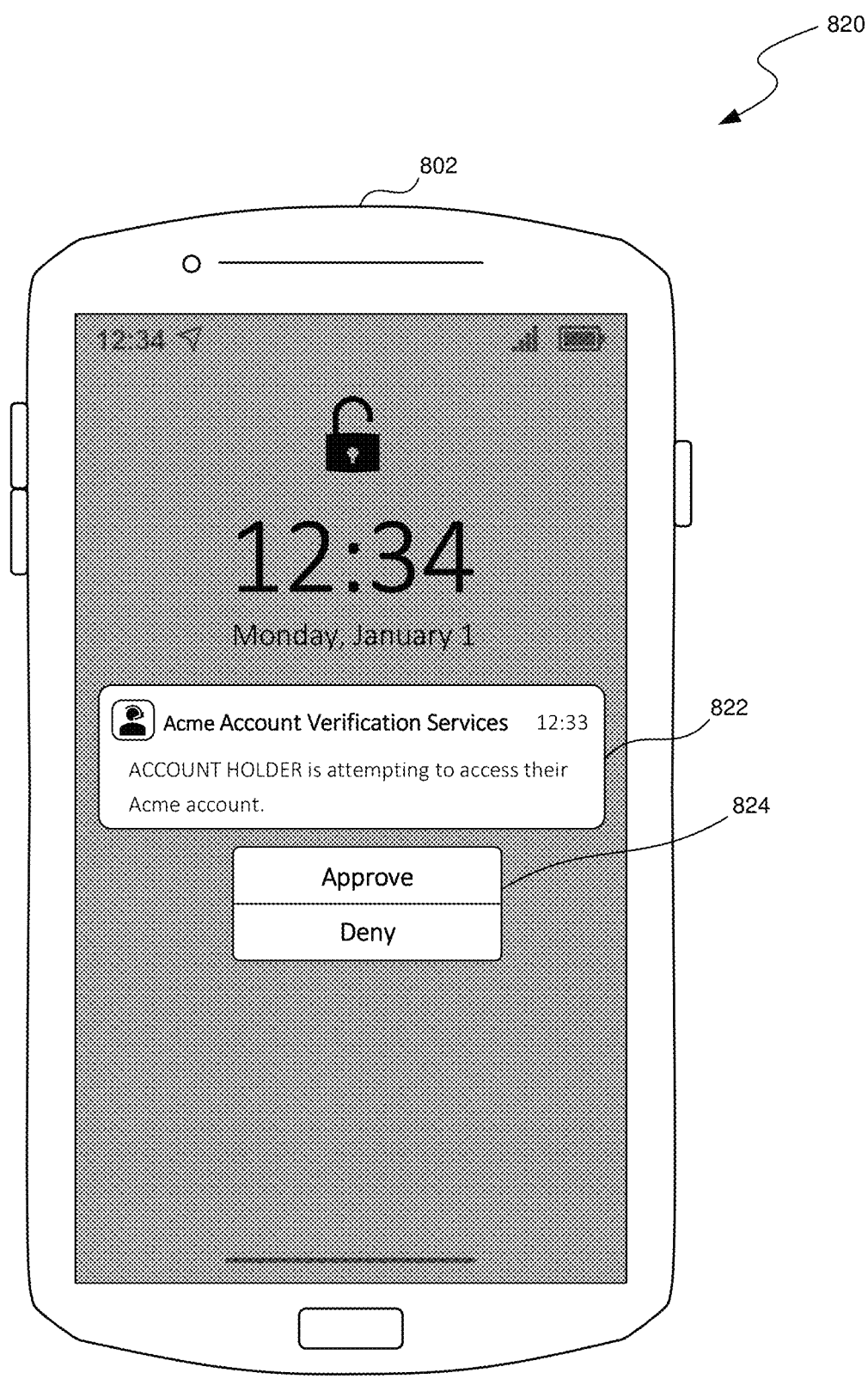
FIG. 8C is a diagram illustrating an example user interface for a designated agent device receiving a push notification to authenticate an account holder.

FIG. 8A is a diagram illustrating an example user interface (UI) 800 for a designated agent device receiving an incoming call to authenticate an account holder. More particularly, FIGS. 8A-8C illustrates example UIs implementing different aspects of an application running on a mobile device 802 of a designated agent that interfaces with a caller verification system. The UIs 800, 810, and 820 may invoke OS-specific libraries (e.g., iOS™ CallKit, Android™ ConnectionService, Apple™ Push Notifications, etc.) to allow the mobile application to provide custom UI elements that are related to a caller verification process of a particular organization.

In the example shown in FIG. 8A, the UI 800 includes a caller context element 804 which specifies that the call is related to Account Verification Services, indicating that the call is intended for the designated agent to provide authentication and/or authorization for a caller believed to an account holder that previously designated the agent. In addition to the commonly provided "Accept" and "Decline" buttons to answer or ignore the call, respectively, the UI includes quick response buttons 806 to allow the agent to "Approve" (e.g., authenticate or authorize), "Deny" (e.g., not authenticate or deny authorization), or "Chat" (e.g., engage in a text-based conversation with the Account Verification Services to facilitate authorization and/or authentication). The quick response buttons 806 may provide convenient ways to an agent to respond to a request for authorization without having to engage in a phone call, which may be preferable in some circumstances, such as if the agent is unable to answer the call or if the agent was already informed by the account holder to expect a verification call.

FIG. 8B is a diagram illustrating an example UI 810 for a designated agent device receiving an email to authenticate an account holder. In this example, a caller verification system generated and transmitted an email to a designate agent requesting verification of a caller's identity. The UI 810 indicates who sent the email (Acme Account Verification Services) to signal to the agent the purpose of the email. The body of the email may include a detailed explanation section 812 about the request, such as the expected identity of the caller (ACCOUNT HOLDER) and instructions for authenticating the caller once the agent has verified them. The email can also include an authentication button 814 that, when pressed by the agent, invokes a URL or URI that performs an HTTP or HTTPS request to the caller verification service indicating that the agent has verified that the caller is the account holder. In addition, the email may include a notice section 816 that requests that the agent notify the organization and/or the account holder if they believe that the caller is committing fraud or is otherwise an unauthorized person wrongfully attempting to access an account holder's account.

FIG. 8C is a diagram illustrating an example UI 820 for a designated agent device receiving a push notification to authenticate an account holder. In this example, a caller verification system generated and transmitted a message to the mobile application, which caused a push notification 822 to appear on the agent's mobile device 802. The push notification 822 may include information about the request, such as the organization requesting verification, the time of the request, and the believed identity of the caller attempting to access an account holder's account. The push notification can be interacted with to invoke a quick actions menu 824, which allows the agent to quickly approve or deny the request for authentication and/or authorization. In some implementations, the agent can open the mobile application to learn more about the request and access additional options (e.g., joining a call, reporting suspicious activity, etc.).

It will be appreciated that the contents, layout, and styling of a user application's UI may vary among different implementations, and that the examples shown in FIGS. 8A-8C are provided for explanatory purposes only.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. ("some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for authenticating a party to a telephone call, the method comprising:
   receiving, at a computing device, an incoming phone call from a caller device associated with a caller;
   establishing a phone call between the caller device and the computing device, wherein the computing device is configured to automatically terminate the phone call if an identity of the caller cannot be verified;
   obtaining caller information associated with the incoming call;
   identifying, based on the obtained caller information, a user account associated with an account holder;
   retrieving designated agent information associated with the user account, wherein the designated agent information includes contact information associated with an agent of the account holder;
   adding, to the established phone call, an agent device based on the retrieved contact information associated with the agent;
   receiving, from the agent device, an indication that the identity of the caller matches the account holder associated with the user account; and
   based on the receipt of the indication that the caller's identity matches the account holder, continuing the phone call between the caller device and the computing device.

2. The method of claim 1,
   wherein establishing a phone call between the caller device and the computing comprises:
     generating, as the phone call, a conference call;
     causing the computing device to join the conference call; and
     adding the caller device to the conference call,
   wherein adding the agent device to the established phone call comprises adding the agent device to the conference call.

3. The method of claim 1, further comprising:
   wherein establishing a phone call between the caller device and the computing comprises:
     generating a first call context;
     causing the computing device to join the first call context; and
     adding the caller device to the first call context, wherein adding the agent device to the established phone call comprises:
  generating a second call context;
  adding the caller device to the second call context; and
  transferring the caller device from the second call context to the first call context.

4. The method of claim 1, wherein receiving the incoming phone call occurs at a first time, and wherein the method further comprises:
  receiving, from the account holder at a second time, a request to register the designated agent with the user account associated with the account holder,
  wherein the second time occurs before the first time.

5. The method of claim 1, wherein receiving the indication that the identity of the caller matches the account holder comprises receiving an audio signal indicating that the identity of the caller matches the account holder.

6. The method of claim 5, wherein the designated agent information further includes a verbal password, wherein the method further comprises:
  determining, from the audio signal, one or more words spoken by the agent; and
  determining that the one or more words matches the verbal password,
  wherein the determination that the one or more words matches the verbal password serves as the indication that the caller's identity matches the account holder.

7. The method of claim 1, wherein receiving the indication that the identity of the caller matches the account holder comprises receiving a text message from the agent device indicating that the identity of the caller matches the account holder.

8. The method of claim 1, wherein receiving the indication that the identity of the caller matches the account holder comprises receiving a request from the agent device to authenticate the identity of the caller as the account holder via activation of a link sent to the agent device.

9. The method of claim 1, further comprising:
  transmitting a notification to at least one of the caller device and the agent device indicating that the agent authenticated the caller.

10. A computing system for authenticating a party to a telephone call, the computing system comprising:
  one or more processors; and
  one or more memories storing instructions that, when executed by the one or more processors, cause the computing system to perform operations comprising:
    receiving, at a computing device, an incoming phone call from a caller device associated with a caller;
    establishing a phone call between the caller device and the computing device;
    obtaining caller information associated with the incoming call;
    identifying, based on the obtained caller information, a user account associated with an account holder;
    retrieving designated agent information associated with the user account, wherein the designated agent information includes contact information associated with an agent, other than the caller, of the account holder;
    transmitting, based on the retrieved contact information, a request to the agent to verify the identity of the caller;
    receiving, from an agent device associated with the agent, an indication that the identity of the caller matches the account holder associated with the user account; and
    based on the receipt of the indication that the caller's identity matches the account holder, authenticating the phone call between the caller device and the computing device.

11. The computing system of claim 10, wherein receiving the incoming phone call occurs at a first time, and wherein the method further comprises:
  receiving, from the account holder at a second time, a request to register the designated agent with the user account associated with the account holder,
  wherein the second time occurs before the first time.

12. The computing system of claim 10, wherein receiving the indication that the identity of the caller matches the account holder comprises receiving a text message from the agent device indicating that the identity of the caller matches the account holder.

13. The computing system of claim 10, wherein receiving the indication that the identity of the caller matches the account holder comprises receiving a request from the agent device to authenticate the identity of the caller as the account holder via activation of a link sent to the agent device.

14. The computing system of claim 10, wherein the operations further comprise transmitting a notification to at least one of the caller device and the agent device indicating that the agent authenticated the caller.

15. A computer-readable storage medium storing instructions that, when executed by a computing system, cause the computing system to perform operations for authorizing a party to a telephone call, the operations comprising:
  receiving, at a computing device, an incoming phone call from a caller device associated with an account holder;
  identifying, based on caller information associated with the incoming call, a user account associated with the account holder, wherein the user account is further associated with permissions that prevent the account holder from performing an action without authorization by an agent associated with the user account;
  establishing a phone call between the caller device and the computing device;
  during the phone call, receiving a request from the account holder to perform the action;
  retrieving designated agent information associated with the user account, wherein the designated agent information includes contact information associated with the agent of the account holder;
  requesting, from the agent based on their retrieved contact information, authorization to allow the account holder to perform the action;
  receiving, from an agent device associated with the agent, authorization to allow the account holder to perform the action; and
  in response to the authorization, performing the action requested by the account holder.

16. The computer-readable storage medium of claim 15, wherein the action comprises updating a password associated with the user account.

17. The computer-readable storage medium of claim 15, wherein the action comprises retrieving sensitive information associated with the account holder.

18. The computer-readable storage medium of claim 15,
  wherein requesting authorization to allow the account holder to perform the action from the agent comprises transmitting a first text message to the agent, and
  wherein receiving authorization to allow the account holder to perform the action comprises receiving a second text message from the agent indicating approval by the agent to authorize the action.

19. The computer-readable storage medium of claim 15,
wherein requesting authorization to allow the account holder to perform the action from the agent comprises transmitting an email to the agent, wherein the email includes an authorization hyperlink, and
wherein receiving authorization to allow the account holder to perform the action comprises receiving a request from the agent device based on an invocation of the authorization hyperlink.

20. The computer-readable storage medium of claim 15,
wherein requesting authorization to allow the account holder to perform the action from the agent comprises transmitting a push notification to an application executed on the agent device, and
wherein receiving authorization to allow the account holder to perform the action comprises receiving a request from the agent device to authorize the action in response to the push notification.

\* \* \* \* \*